United States Patent Office 2,801,899
Patented Aug. 6, 1957

2,801,899

PREPARATION OF ANHYDROUS ALKALINE EARTH HALIDES

Louis R. Grant and Moddie D. Taylor, Washington, D. C., assignors to Callery Chemical Company, Pittsburgh, Pa., a corporation of Pennsylvania No Drawing. Application May 12, 1955,
Serial No. 508,000

7 Claims. (Cl. 23—90)

This invention relates to a new and improved method for the preparation of anhydrous alkaline earth halides.

In recent years there has been considerable interest in reactions involving non-aqueous solvents. Such reactions require anhydrous compounds that have appreciable solubility in these solvents. Anhydrous metal halides in general and the alkaline earth iodides in particular are among the most useful compounds for this purpose. However, these compounds are difficult to obtain in an anhydrous state. One method of preparing alkaline earth iodides involves the reaction of the metal with iodine which although direct is also inconvenient because the metal is not always available. Another method of preparation is the reaction of dry ammonium iodide with an alkaline earth hydroxide at elevated temperatures. This latter method is not wholly satisfactory because the yields are low and the product is impure. A more desirable method would be one which could be carried out in a non-aqueous solvent at room temperature and result in a pure anhydrous product.

It is an object of this invention to provide a new and useful method for preparing pure anhydrous alkaline earth halides which is simple and economical to carry out.

Another object is to provide a new and improved method for preparing anhydrous alkaline earth iodides which can be carried out in a non-aqueous solvent at room temperature and which results in quantitative yields of pure product.

Another object is to provide a new and improved method for preparing barium iodide by the reaction of barium hydride with ammonium iodide in pyridine.

Other objects will become apparent throughout the specification and appended claims.

This new and improved method will be more fully described hereinafter and the novelty thereof will be particularly pointed out and distinctly claimed.

This invention is based upon the discovery that pure anhydrous alkaline earth halides can be prepared in quantitative yields by the reaction of an alkaline earth hydride and dry ammonium halide in a non-aqueous solvent in which the alkaline earth halide is soluble. The hydride is used in excess and is readily filtered away from the solution of alkaline earth halide formed. Upon removal of the solvent by distillation under vacuum, the solid anhydrous alkaline earth halide is obtained.

In one experiment, barium iodide was prepared according to the equation:

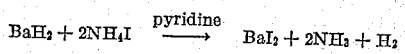

$$BaH_2 + 2NH_4I \xrightarrow{pyridine} BaI_2 + 2NH_3 + H_2$$

The following procedure was used. In a 1 liter, round-bottom, three-necked flask equipped with a dropping funnel and a mercury sealed stirrer was placed 12 g. (0.086 mol) of barium hydride suspended in 500 ml. of anhydrous pyridine. To this stirred suspension was added dropwise a solution of 21.87 g. (0.151 mol) of ammonium iodide dissolved in 125 ml. of pyridine. When the evolution of hydrogen ceased, the reaction was considered complete. The reaction mixture was filtered and the pyridine separated from the filtrate by distillation under vacuum leaving a white solid. The final traces of pyridine were removed by heating the solid to 150–160° C. in a vacuum oven. A yield of 28.6 g. of anhydrous barium iodide was obtained which represents 97% of theoretical. It analyzed 100% pure by the gravimetric iodide method. Although barium iodide is sensitive to air and moisture, it can be kept in a stoppered bottle for months with only slight discoloration.

Other experiments showed that this method can be used successfully to prepare anhydrous halides of all the alkaline earth metals such as calcium, magnesium, strontium and beryllium by using a non-aqueous solvent in which the alkaline earth halide is soluble.

Having thus described the principles and best mode of carrying out this invention as required by the patent statutes, it should be understood that within the scope of the appended claims this invention may be practiced otherwise than as specifically described.

What is desired to be claimed and secured by United States Patent is:

1. A method of preparing anhydrous alkaline earth halides which comprises reacting an alkaline earth hydride with an ammonium halide in a non-aqueous solvent in which the alkaline earth halide is soluble and recovering the alkaline earth halide formed.

2. A method according to claim 1 in which the solvent is pyridine.

3. A method according to claim 1 in which a slight stoichiometric excess of hydride is used according to the equation: $MH_2 + 2NH_4X \rightarrow MX_2 + 2NH_3 + H_2$ in which M is an alkaline earth metal and X is a halogen.

4. A method according to claim 1 which is carried out at room temperature.

5. A method according to claim 2 in which the pyridine is removed from the alkaline earth iodide by distillation under vacuum followed by vacuum drying at a temperature of about 150° C.

6. A method according to claim 1 in which the hydride used is barium hydride and the iodide recovered is barium iodide.

7. A method of preparing anhydrous barium iodide which comprises reacting a solution of ammonium iodide in pyridine with a slight stoichiometric excess of a suspension of barium hydride in pyridine according to the equation: $BaH_2 + 2NH_4I \rightarrow BaI_2 + 2NH_3 + H_2$ at room temperature, filtering the excess barium hydride from the solution of barium iodide formed and recovering the barium iodide by distillation of the pyridine solvent under vacuum.

References Cited in the file of this patent

J. W. Mellor's "A Comprehensive Treatise on Inorganic and Theoretical Chem.," vol. 3, 1923 ed., pp. 650, 651, Longmans, Green and Co., New York.

"Introductory Information on Calcium Hydride," CX-SE Form 12, 2 pages. Published by Lithaloys Corp., 444 Madison Ave., New York 22, New York.